(12) United States Patent
Mosse et al.

(10) Patent No.: US 7,578,592 B2
(45) Date of Patent: Aug. 25, 2009

(54) OPHTHALMIC LENS WITH AN OPTICALLY TRANSPARENT COMPOSITE FILM EXHIBITING BOTH IMPACT-RESISTANCE PROPERTY AND POLARIZING PROPERTY, AND A PROCESS FOR ITS MANUFACTURE

(75) Inventors: Herbert Mosse, St. Petersburg, FL (US); Richard Muisener, St. Petersburg, FL (US)

(73) Assignee: Essilor International Compagnie Generale d'Optique, Charenton-le-Pont (FR)

( * ) Notice: Subject to any disclaimer, the term of this patent is extended or adjusted under 35 U.S.C. 154(b) by 0 days.

(21) Appl. No.: 11/937,879

(22) Filed: Nov. 9, 2007

(65) Prior Publication Data

US 2008/0055540 A1 Mar. 6, 2008

Related U.S. Application Data

(63) Continuation of application No. 10/540,173, filed as application No. PCT/EP2005/002262 on Mar. 1, 2005, now Pat. No. 7,357,503.

(60) Provisional application No. 60/549,366, filed on Mar. 2, 2004.

(51) Int. Cl.
 *G02C 7/10* (2006.01)
(52) U.S. Cl. .................. 351/163; 351/177; 351/49
(58) Field of Classification Search ........... 351/163
 See application file for complete search history.

(56) References Cited

U.S. PATENT DOCUMENTS

| | | | |
|---|---|---|---|
| 3,994,760 A | 11/1976 | Park | 156/102 |
| 4,648,925 A | 3/1987 | Goepfert et al. | 156/153 |
| 4,683,153 A | 7/1987 | Goepfert et al. | 428/1.31 |
| 4,865,668 A | 9/1989 | Gorpfert et al. | 156/74 |
| 4,977,028 A | 12/1990 | Goepfret et al. | 428/426 |
| 5,015,523 A | 5/1991 | Kawashima et al. | 428/338 |
| 5,943,104 A | 8/1999 | Moddel et al. | 349/13 |
| 6,220,703 B1 | 4/2001 | Evans et al. | 351/163 |
| 6,491,851 B1 | 12/2002 | Keller et al. | 264/1.32 |
| 2002/0027301 A1 | 3/2002 | Kato et al. | 264/1.7 |
| 2002/0071091 A1 | 6/2002 | Degand et al. | 351/159 |
| 2002/0090516 A1 | 7/2002 | Loshak et al. | 428/412 |
| 2003/0165698 A1 | 9/2003 | Vaneeckhoutte et al. | 428/447 |
| 2005/0123771 A1 | 6/2005 | Vaneeckhoutte et al. | 428/426 |

FOREIGN PATENT DOCUMENTS

| | | |
|---|---|---|
| EP | 0887667 | 12/1998 |
| EP | 1039994 | 10/2000 |
| FR | 2317671 | 2/1977 |
| FR | 2702486 | 9/1994 |
| JP | H2-96371 | 4/1990 |
| JP | H3-294802 | 12/1991 |

*Primary Examiner*—Jessica T Stultz
(74) *Attorney, Agent, or Firm*—Fulbright & Jaworski L.L.P.

(57) ABSTRACT

The present invention relates to a light polarizing ophthalmic lens comprising a substrate made of organic glass and an optically transparent composite film deposited on the front main face of the substrate, said transparent composite film comprising a latex layer having an outer main face provided with parallel microgrooves, and a polarizing dye material filling at least partially the said microgrooves. The present invention also relates to a process for the manufacture of the light polarizing ophthalmic lens.

42 Claims, No Drawings

OPHTHALMIC LENS WITH AN OPTICALLY TRANSPARENT COMPOSITE FILM EXHIBITING BOTH IMPACT-RESISTANCE PROPERTY AND POLARIZING PROPERTY, AND A PROCESS FOR ITS MANUFACTURE

This application is a continuation of application Ser. No. 10/540,173, filed 17 Jun. 2005, which is a national phase application under 35 U.S.C. § 371 of International Application No. PCT/EP2005/002262 filed 1 Mar. 2005, which claims the benefit of U.S. Provisional Application No. 60/549,366 filed 2 Mar. 2004. The entire contents of these applications are incorporated by reference.

BACKGROUND OF THE INVENTION

The present invention relates to a light polarizing ophthalmic lens made of organic glass with an optically transparent composite film exhibiting both impact-resistance and polarizing properties, and to a process for its manufacture.

It is known that the manufacture of polarizing lenses raises various problems related to the solubility of the polarizing materials (generally polarizing particles) in the surrounding environments, as well as their very low mechanical strength.

A number of solutions have been proposed in the state of the art.

Some of them have consisted in associating an organic polarizing film of the polyvinyl alcohol type with one or two ("sandwich") elements of glass. These solutions of the prior art have the following disadvantages:

- the complexity of bonding the polarizing film to an optical substrate without deforming the direction of polarization, as indicated in the French patent FR 76 18891,
- the weight of the assemblies thus obtained, which are not compatible with conventional lenses utilised in spectacles, and finally,
- the extremely high cost of such products, which is a result of their complexity.

Other solutions have consisted in providing polarizing films of the polyvinyl acetate or polyvinyl butyrate type bonded onto the concave face of an inorganic spectacle lens. But these films have a very poor optical quality and a significant sensitivity to scratching. Furthermore, it is necessary to protect them from moisture.

U.S. Pat. No. 4,977,028, U.S. Pat. No. 4,865,668, U.S. Pat. No. 4,683,153 and U.S. Pat. No. 4,648,925 describe laminated, transparent, polarizing glass articles, comprising a support of inorganic or organic glass having parallel microgrooves, formed on one of the faces of the support, a polarizing coating deposited on the said face of the support, and a composite film of polyurethane constituted by a thermoplastic polyurethane side and a thermosetting polyurethane side, the thermoplastic polyurethane side adhering to the polarizing coating. However, a consequence of this technique is that it is necessary to replace the whole lens if defects appear in the microgrooves. Another consequence of this technique is that the impact strength is reduced at the microgrooves. Furthermore, nothing is said concerning the mechanical strength of the lens.

Japanese patent application H2-96371 describes a method for forming a polarizing film having a polarizing function, which is applied to liquid crystal display components (LCD). The polarizing film is a layer of photosensitive resin dyed using iodine or a dichromatic dye as the polarizing element. Numerous fine grooves are formed in the surface of this layer of photosensitive resin by performing interference exposure and development processes using holographic techniques. The polarizing element is oriented and dyed in these fine grooves. However, nothing is said in this patent application concerning the mechanical strength of this polarizing film.

SUMMARY OF THE INVENTION

The applicant has now discovered, unexpectedly, that it is possible to deposit an optically transparent composite film, exhibiting both polarizing property and impact-resistance property.

The applicant has discovered that it is possible to realize such a composite film by employing a latex layer in which microgrooves are formed, and then filling at least these fine microgrooves with a polarizing dye material.

The layering of the latex layer and the polarizing dye material in accordance with the present invention makes it possible to produce an ophthalmic lens with a transparent composite film having both impact-resistant property and polarizing property which is deposited on the front face of the substrate, whereas it is generally admitted that an impact-resistant layer is preferably deposited on the rear face of the substrate.

However, it is also within the scope of the invention to optionally, and preferably, apply a classical non polarizing primer coating improving the impact resistance on the rear face of the substrate.

By rear face of the substrate or of the lens it is meant the face, which in use, will be the closest to the weaver's eye. Conversely, the front face of the substrate or of the lens is the face, which in use, will be the furthest to the weaver's eye.

The lenses bearing the polarizing and impact resistant primer coating according to the invention passes the FDA drop ball test (impact of a 16 g ball dropped from a height of 1.27 m) (ANSI Z87.1-1989 standard), while keeping very good optical qualities such as low visual haze or no visual haze.

Preferably lenses bearing the polarizing and impact resistance primer coating according to the invention has a mechanical strength resistant to impact energy of not smaller than 2 times the impact energy of the FDA drop ball test (equal to 0.2 joules), preferably not smaller than 3, and even better than 4 times.

Preferably, the lenses bearing the polarizing and impact resistance primer coating according to the invention are thin, i.e. they preferably have a center thickness of less than 2 mm, more preferably less than 1.5 mm and even better less or equal to 1.2 mm.

Another subject of the invention relates to a process for the manufacture of a lens as defined above.

Other subjects will become apparent in the light of the description.

DETAILED DESCRIPTION OF THE INVENTION

The present invention aims to provide an ophthalmic lens, which permits satisfaction of the above-mentioned needs.

More precisely, the present invention is concerned with an ophthalmic lens comprising:

a a substrate made of organic glass, said substrate comprising front and rear main faces,
b an optically transparent composite film deposited on the front main face of the substrate, said transparent composite film comprising:
   a latex layer having an outer main face provided with parallel microgrooves, and
   a polarizing dye material filling at least partially the said microgrooves.

By outer main face of the composite film, it is meant, in the sense of the present invention, the face of the film opposite to the face in contact with the substrate.

Preferably, the polarizing dye material fills at least 50% of the volume of the microgrooves.

The polarizing dye material may also fill totally the aforesaid microgrooves, or may even preferably form a continuous layer over the said microgrooves.

The substrates of the lenses in accordance with the present invention are substrates made of organic glass which are commonly employed for organic ophthalmic lenses.

By way of preference, there may be mentioned:

(1) diethylene glycol bis(allylcarbonate) (sold under the trade name CR-39 allyldiglycolcarbonate by the Company PPG Industries Inc). polymer and copolymer based substrates;

(2) (Meth)acrylic polymer and copolymer based substrates such as substrates obtained by polymerization of acrylic monomers derived from bisphenol A, in particular those obtained by polymerization of a composition containing:

A a component (A) including: at least 50% by weight of a monomer or a mixture of monomers, corresponding to the formula (I):

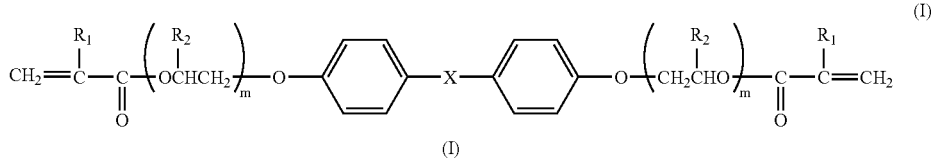

in which $R_1$ and $R_2$, which are identical or different, denote hydrogen or $C_1$-$C_6$ alkyl; X denotes

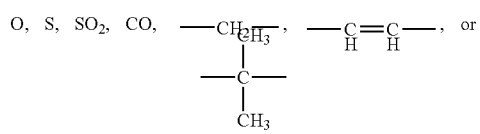

m+n are between 0 and 10

0 to 50% by weight of one or a number of mono-or polyfunctional vinyl, acrylic or methacrylic comonomer(s) (II);

B a component (B) present in proportions of 0.5 to 15% by weight, preferably 1 to 5% by weight relative to the weight of the components I+II, including a compound of formula (III):

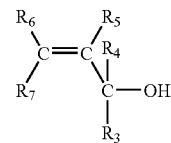

in which:

$R_3$ and $R_4$ denote hydrogen, or else one of the radicals $R_3$ or $R_4$ is a hydrogen atom while the other forms a ring with $R_7$ containing 5 to 10 carbon atoms, optionally substituted by one or a number of linear or branched $C_1$-$C_4$ alkyl group(s);

$R_5$, $R_6$ and $R_7$ are chosen, independently of one another, from the hydrogen atom and $C_1$-$C_6$ alkyl groups which may be substituted by one or more OH group(s) and the chain of which may optionally be interrupted by one or more ether, ester or keto group(s), it being possible for $R_7$ to form a $C_5$-$C_{10}$ ring optionally substituted by one or a number of linear or branched $C_1$-$C_4$ alkyl group(s), with one of the radicals $R_3$ or $R_4$.

(3) the glasses obtained by polymerization of allyl monomers derived from bisphenol A, such as those described in U.S. Pat. No. 4,959,429, and more particularly those obtained by polymerization of a composition containing:

(A) a component (A) including at least 50% by weight of a monomer or a mixture of monomers, corresponding to the formula (1):

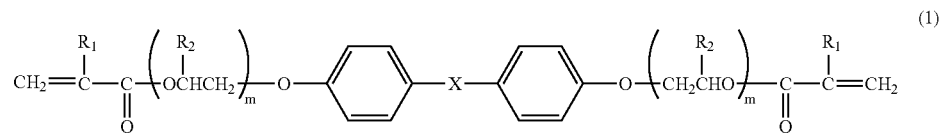

in which:

X denotes

O, S, SO$_2$, CO, —CH$_2$—, —C=C—, or

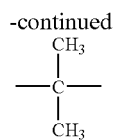

and R and R' are chosen from H and $CH_3$;

0 to 50% by weight of one or a number of mono-or polyfunctional allyl, vinyl, acrylic or methacrylic comonomer(s) (2);

(B) a component (B) including from 0.2 to 10% by weight, preferably 0.3 to 5% by weight relative to the weight of the components (1) and (2), of a compound of formula (3):

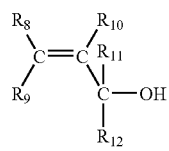

(3)

in which $R_{11}$ and $R_{12}$ denote hydrogen or else one of the radicals, $R_{11}$ or $R_{12}$ is a hydrogen atom, while the other forms a $C_5$ or $C_7$-$C_{10}$ ring with $R_9$, optionally substituted by one or a number of linear or branched $C_1$-$C_4$ alkyl group(s);

$R_8$, $R_9$ and $R_{10}$ are chosen, independently of one another, from the hydrogen atom and $C_1$-$C_6$ alkyl groups which may be substituted by one or more OH group(s) and the chain of which may optionally be interrupted by one or more ether, ester or keto group(s); it being possible for $R_9$ to form a $C_5$ or $C_7$-$C_{10}$ ring optionally substituted by one or a number of linear or branched alkyl group(s) with one of the groups $R_{11}$ or $R_{12}$.

Other examples of substrates that can be employed according to the invention which may be mentioned are:

(4) the substrates obtained from poly(methyl methacrylate);
(5) the substrates obtained from a polystyrene resin;
(6) the substrates obtained from a resin based on diallyl phthalate;
(7) thio(meth)acrylate polymer and copolymer based substrates;
(8) polythiourethane polymer and copolymer based substrates;
(9) polyurethane-urea or polythiourethane-urea copolymer based substrates;
(10) epoxy and/or episulfide polymer and copolymer based substrates;
(11) thermoplastic polycarbonate substrates;
(12) thiol-ene polymer based substrates.

The latex layer of the transparent composite film of the invention can be made from any latex composition typically used for forming an impact-resistant primer coating.

By definition, an impact-resistant primer coating is a coating which improves the impact resistance of the finished optical article (for instance an ophthalmic lens such as in the present invention) as compared with the same optical articles without the impact resistant coating.

The latex layer of the transparent composite film of the invention can be made from a latex composition such as a poly(meth)acrylic latex, a polyurethane latex or a polyester latex.

Preferably, the latex is a polyurethane latex.

Some polyurethane latex usable in the process of the invention are described for example in EP 680492.

Preferably, all particles of the latex have a size of less than 100 nm, and more than 90% of the particles have a size of less than 10 nm, more preferably less than 5 nm.

The preferred latexes are anionically stabilized.

Another preferred feature of the latex usable in the process of the invention is that the latexes are not crosslinked.

Preferably, the glass transition temperature Tg of the latex, once cured, is less than 0° C., more preferably less than –20° C., better less than –40° c., the preferred range being –40° C. to –60° C.

Among the preferred latex compositions, there may be cited the acrylic latex commercialized under the name Acrylic latex A-639 commercialized by Zeneca and polyurethane latex commercialized under the names W-240, and W-234 by Baxenden (W-234 has a Mn of nearly 12600g and 40% by weight solid content).

The latex layer of the transparent composite film of the invention presents the advantage that it can easily be removed and replaced, when, for instance, the microgrooves present some defects.

Furthermore, the latex layer of the transparent composite film of the invention has the added benefit of "healing" the microgrooves with time. This feature should reduce perceptible haze as compared to a scratched hard layer such as glass.

According to the present invention the thickness of the latex layer, generally ranges from 0.5 μm to 5 μm, preferably from 0.5 to 2 μm and more particularly of about 1 μm.

As previously mentioned, the parallel microgrooves are formed on the outer face of the latex layer which is opposite to the substrate. Preferably, the depth of the said microgrooves ranges from 50 to 300 nm, and more particularly is of about 100 nm. The width of the said microgrooves preferably ranges from 5 nm to 5 micrometers, preferably to less than 1 micrometer, and even better 5 nm to less then 500 nm.

The polarizing dye material can be of various types.

Examples of typical polarizing dye materials that may be used in the present invention are disclosed in patents U.S. Pat. No. 4,977,028 and U.S. Pat. No. 4,865,668.

For instance, an example of a suitable dye material is made from a composition comprising a mixture of three colorants corresponding to the three primary colors blue-red-yellow and exhibiting a nematic state. Suitable organic colorants have been commercialized by the 3M company of St Paul, Minn., U.S.A., under the brand name "3M Veri-light 25".

These dyes are available from Sterling Optics (William Town Ky.) under the trade mane "Veri-light 2P".

Upon polarizing dye materials, mention may also be made of those made from polarizing dye compositions comprising organic dyes, for instance those sold by the firm Sterling Optics, and an activator, for instance an alkaline wetting agent. The concentration of the dyes in these polarizing dye compositions ranges from 4 to 10% solids.

The ophthalmic lenses according to the invention may further be coated with a hard abrasion-resistant coating deposited on the optically transparent composite film, and optionally with an anti-reflection coating applied to the abrasion-resistant coating.

By definition, a hard abrasion-resistant coating is a coating, which improves the abrasion resistance of a layer stack as compared to the same layer stack but without the abrasion-resistant coating.

The hard abrasion-resistant coating employed according to the present invention can be any hard abrasion-resistant coating. These hard abrasion-resistant coatings are well known in the art.

Among the abrasion-resistant hard coatings recommended in the present invention, mention may be made of coatings obtained from compositions based on a silane hydrolysate, particularly an epoxysilane hydrolysate, such as those described in French Patent Application N°93/02649 and in U.S. Pat. No. 4,211,823.

A preferred abrasion-resistant hard coating composition comprises, with respect to the total weight of the composition, approximately 22% of glycidoxy-propylmethyldimethoxysilane, 62% of colloidal silica with a solid content of 30% and 0.7% of aluminium acetylacetonate (a catalyst), the balance essentially consisting of the solvents conventionally used for formulating such compositions.

Preferably, the hydrolysate used is a hydrolysate of γ-glycidoxypropyltrimethoxysilane (GLYMO) and of dimethyldiethoxysilane (DMDES).

The thickness of the hard abrasion-resistant coating is generally between 1 and 10 μm and more particularly between 2 and 6 μm.

The hard abrasion-resistant coating can be applied on the optically transparent composite film using any classical method such as spin, dip or flow-coating.

As indicated above, the ophthalmic lens according to the invention may furthermore include an anti-reflection coating deposited on the abrasion-resistant coating.

By way of example, the anti-reflection coating may consist of a monolayer or multilayer film of dielectric materials such as $SiO$, $SiO_2$, $Si_3N_4$, $TiO_2$, $ZrO_2$, $Al_2O$, $MgF_2$ or $Ta_2O_5$ or their mixtures.

In this way, it becomes possible to prevent the appearance of a reflection at the lens/air interface.

This anti-reflection coating is generally applied by vacuum deposition using one of the following techniques:

1. by evaporation, possibly assisted by an ion beam;
2. by ion beam sputtering;
3. by cathodic sputtering;
4. by plasma-enhanced chemical vapour deposition.

Apart from vacuum deposition, it is also conceivable for an inorganic layer to be deposited by the sol-gel route, for example, using tetraethoxysilane hydrolysates.

If the film comprises a single layer, its optical thickness must be equal to λ/a where λ is a wavelength lying between 450 and 650 nm.

In the case of a multilayer film comprising three layers, a combination corresponding to respective optical thicknesses of λ/4-λ/2-λ/4 or λ/4-λ/4-λ/4 may be used.

It is also possible to use an equivalent film formed by more layers, instead of any of the layers forming part of the three aforementioned layers.

The ophthalmic lenses according to the invention may also be coated with an additional hydrophobic top coat deposited on the anti-reflecting coating.

The hydrophobic top coat constitutes, in the finished optical article, the outermost coating, and is intended for improving dirty mark resistance of the finished optical article and in particular of the anti-reflecting coating.

Such hydrophobic top coats are well known in the art and are usually made of fluorosilanes or fluorosilazanes i.e. silicones or silazanes bearing fluorine-containing groups. Example of a preferred hydrophobic top coat material is the product commercialized by Shin Etsu under the name KP 801M, or OPTOOL DSX from Daikin.

Thickness of the hydrophobic top coat usually ranges from 1 to 30 nm, preferably 1 to 15 nm.

As said previously, the rear face can be optionally and preferably coated with an impact resistance primer whose preferred constituting material is the same as described above.

An abrasion resistant coating and/or an antireflective coating may be further deposited in this order on the primer coating.

The invention is also concerned with a process for obtaining such an ophthalmic lens comprising the following steps:
a providing a substrate made of organic glass having front and rear main faces,
b optionally carefully cleaning and drying the front face of the substrate, which is to receive an optically transparent composite film comprising a latex layer and a polarizing dye material,
c applying on the front face of the substrate a latex composition and drying or partially precuring said composition to form a dry latex layer having an outer face,
d preparing the front face of the latex layer by forming parallel microgrooves on the said front face of the latex layer,
e depositing a polarizing dye material on the front face of the said latex layer with the said microgrooves, the said microgrooves being at least partially filled by the polarizing dye material and,
f treating the resulting dye material for fixing the said polarizing dye material.
Preferably the fixing of said polarizing dye is made by heating the dye with an aqueous solution of inorganic salts in order to reduce the water solubility of said dye material.

After step "f" a hard coat (abrasion resistant coating) may optionally be deposited and further coated by an antireflective coating (optionally).

The parallel microgrooves may also be totally filled, or even preferably covered by a continuous layer of the said polarizing dye material.

The latex composition can be applied on the front face of the substrate using any classical method such as spin, dip or flow coating.

The latex composition can be simply dried at ambient temperature or optionally precured at higher temperature before applying the polarizing dye material.

After the latex composition has been applied onto the front face of substrate, the latex composition may be dried at ambient temperature or cured at a temperature ranging from 30 to 200° C., preferably from 60 to 150° C., and particularly for 1 to 60 minutes.

Optimal conditions are 80° C. for 15 minutes.

Depending upon the nature of the latex composition, thermal curing, UV-curing or a combination of both can be used.

The parallel microgrooves may be made, on the outer face of the transparent composite film, with the aid of a gentle abrasion of the said outer face.

For instance, the outer face of the transparent composite film may be rubbed by using a soft cloth and abrasives.

Example of a preferred soft cloth is the product commercialized by Buehler under the name Nanocloth Psa.

Example of preferred abrasives are alumina abrasive, particularly those commercialized by Buehler, which have a diameter of 0.05, 0.3 and 1.0 microns.

The microgrooves may also be made through a process comprising a step for transferring a microstructure corresponding to the microgrooves from a mould, an internal face of which supports the said microstructure. Example of such a molding process that may be used in the present invention is disclosed in U.S. Pat. No. 6,491,851 and EP 1039994, which can be referred to for more details and whose teachings are incorporated herein by reference. In such a molding process, transfer molding techniques such as die-stamping, overmolding and in-mould coating may be used to provide the microgrooves in the latex layer.

In the overmolding technique, a curable monomer and/or liquid polymer is injected between the surface of a lens and the surface of a lens mold part. The monomer and/or polymer is cured and once the mold part is removed, one obtain a lens having a replicated microgroove pattern in a thin layer of polymer at the surface of the lens.

Another technique for manufacturing the lens having the front face with a latex layer bearing microgrooves may be to use a film bearing on one side a latex layer having already microgrooves at its surface and make the other side of this film adhere to the core of a lens substrate, for example by sticking this film to an already cured lens substrate or by putting it into contact with a curable lens material and cure the curable lens material.

During this step, there is no modification of the structure of the microgrooves.

If the microgrooves are made with the aid of a very gentle abrasion of the outer face of the transparent composite film, the preparation of the said outer face may be followed by a cleaning step to remove all abrasive particles.

This cleaning step may comprise:
rinsing with water the outer face of the transparent composite film, and then washing it with a soft cloth,
rinsing again with deionized water the said outer face, and then drying it.

After cleaning, the latex layer may be placed, prior to coating, in a room with a controlled atmosphere of 30±1° C. and a relative humidity of 30±10%. The lens is then equilibrated to desired temperature generally 30° C. for at least 3 minutes.

The polarizing dye material may be deposited by spin coating in the microgrooves of the latex layer, with an application speed varying generally from 100 to 500 rpm and spinning at a speed ranging generally from 500 to 1500 rpm for 60 s.

After the polarizing dye material has been applied, it is then treated with an aqueous solution of inorganic salts, in order to reduce the water solubility of the aforesaid polarizing coating.

Among the inorganic salts, there may be cited: dehydrated barium chloride, aluminum chloride, or barium chloride, for instance those commercialized by Aldrich.

After such a treatment, the lens is generally rinsed thoroughly with deionized water and dried.

The process for producing a lens of the invention may also include, after applying the transparent composite film on the front face of the substrate, the following steps:
applying a hard abrasion-resistant coating on the transparent composite film, and/or,
applying an anti-reflection coating on the hard abrasion-resistant coating, and/or,
applying an hydrophobic top coat on the anti-reflection coating.

In a preferred embodiment, one also applies on the rear face of the lens a primer coating such as a latex coating chosen preferably within the same latex as the latex used for primer coating the front face of the lens.

The following example illustrates the present invention. In the example, unless otherwise indicated all percentages and parts are expressed by weight.

EXAMPLE 1

The application of an optically transparent composite film of the invention onto substrates made of CR 39® (ORMA® lenses, Orma is a registered trade mark of Essilor International) was effected as follows, in four stages:

1. Application of the Latex Layer

After cleaning and drying the front face of the substrate, a latex layer (W234 sold from the Baxenden company), was deposited on the front face of the substrate, by spin coating. The required quantity 2 to 3 mL of the latex was deposited from the center of the edge of the rotating substrate (rotation speed : 500 r.p.m.) in 5 seconds. The rotation speed of the substrate was then increased to 750 r.p.m., so that the later film reached a uniform thickness, and this rotation speed maintained for 8 seconds. The rotation was then stopped and the lens was dried at 80° C. for 15 minutes in an oven.

2. Preparation of the Outer Face of the Latex Layer

The outer face of the latex layer (which is opposite to the substrate) is rubbed using the soft cloth Nanocloth Psa® sold by BUEHLER and alumina abrasives, also sold by BUHLER. Rubbing is performed by hand in as uniform back and forth manner, applying a slight pressure.

After the application of the latex layer in the substrate, the lens is cleaned to remove all abrasive particles, and then rinsed with water, washed with Joy soap commercial dishwashing detergent, and then rinsed with deionized water, and finally dried under a lens dryer.

The lens, prior to coating with the polarizing dye material, is placed in a room with a controlled atmosphere of 30±1° C. and 50±10% relative humidity.

3. Application of the Polarizing Dye Material

The lens is then equilibrated to the desired temperature, 30° C., for at least 3 minutes.

Once the desired temperature is reached, the face of the latex layer with the microgrooves is spin coated with a polarizing dye material comprising organic dyes, for instance those sold by the firm Sterling Optics, and an activator, for instance an alkaline wetting agent. The dyes represent, in the polarizing dye material, from 4 to 10% solids.

Once the polarizing dye material is applied, it is then fixed to reduce the water solubility. To this end, the lens is dipped for 20 s to 30 minutes into a 20% aqueous salt solution of (an) inorganic salt(s) which may be selected among barium chloride dehydrate, aluminium chloride or barium chloride from the firm Aldrich.

The lens is then rinsed thoroughly with deionized water and dried.

4. Coating

A hard coat can be applied to protect the dye layer, and is generally and preferably the same as the hard abrasion-resistant coating described previously.

Obviously the invention is not limited at the details of the method described above by way of a single example and may, in particular, comprise other steps or be subject to variations, while still remaining with the protection defined by the claims.

EXAMPLES 2 AND 3

6 base Orma plano lenses (base=530/R, R in mm) are treated according to the same protocol as in example 1. Then a hard coat HC1 is deposited on the primer.

In the comparative experiments (comp 1 and 2), no microgrooves and no polarizing dyes are present. Then, impact resistance of lenses are tested using the same protocol as the FDA protocol except that the energy of the impact is increased by increasing the height of the drop fall.

When a crack visible by the naked eye appears, one notes the impact resistance and an average value (Eavg in millijoules) is calculated and is reported in the table hereafter.

It is seen from the result in the table herafter that even if the latex layer comprises microgrooves and a polarizing dye (Sterling dye), one obtains similar results in terms of impact resistance, i.e. there is no decrease of impact resistance due to microgrooves and polarizing dye.

|  | Lens material | Primer cc | Primer cx | Sterling dye cx | Hard coat cc | Hard coat cx | Eavg mJ |
|---|---|---|---|---|---|---|---|
| Comp 1 | 221-106-1 Orma* | PU | PU | — | HC1 | HC1 | 3482 |
| Ex2 | 221-108-1 Orma* | PU | PU | yes | HC1 | HC1 | 3701 |
| Comp 2 | 221-108-2 Orma* | — | PU | — | HC1 | HC1 | 1570 |
| Ex3 | 221-108-5 Orma* | — | PU | yes | HC1 | HC1 | 1480 |

PU is a latex W234 from Baxenden.
HC1 is a hard coat based on a hydrolyzate of Gamma Glycidoxypropyl trimethoxysilane.
Cc: concave side (back side or rear side: the lens side closest to the wearer's eye).
Cx: convex side (front side: opposite to the back side).

What is claimed is:

1. An ophthalmic lens comprising:
   a) a substrate made of organic glass, said substrate comprising front and rear main faces,
   b) an optically transparent composite film deposited on the front main face of the substrate, said transparent composite film comprising:
      a dried or partially precured latex layer having an outer main face provided with parallel microgrooves, said latex layer not being cross-linked wherein the resulting ophthalmic lens has a mechanical strength resistant to impact energy of not smaller than 2 times the impact energy of the FDA drop ball test, and
      a polarizing dye material filling at least partially the said microgrooves.

2. The ophthalmic lens of claim 1, wherein the polarizing dye material fills at least 50% of the volume of the microgrooves.

3. The ophthalmic lens of claim 1, wherein the polarizing dye material totally fills the microgrooves.

4. The ophthalmic lens of claim 3, wherein the polarizing dye material forms a continuous layer over the microgrooves.

5. The ophthalmic lens of claim 1, wherein the polarizing dye material is made from a mixture comprising organic colorants and an alkaline wetting agent.

6. The ophthalmic lens of claim 1, wherein the organic colorants correspond to the three primary colours and exhibit a nematic state.

7. The ophthalmic lens of claim 1, wherein the depth of the microgrooves ranges from 50 to 300 nm.

8. The ophthalmic lens of claim 1, wherein the depth of the microgrooves is about 100 nm.

9. The ophthalmic lens of claim 1, wherein the width of the microgrooves ranges from 5 nm to 5 micrometers.

10. The ophthalmic lens of claim 1, wherein the width of the microgrooves ranges from 5 nm to less than 1 micrometer.

11. The ophthalmic lens of claim 1, wherein the thickness of the latex layer ranges from 0.5 to 5 μm.

12. The ophthalmic lens of claim 1, wherein the thickness of the latex layer ranges from 0.5 to 2 μm.

13. The ophthalmic lens of claim 1, wherein the thickness of the latex is about 1 μm.

14. The ophthalmic lens of claim 1, wherein the latex is poly(meth)acrylic latex, polyurethane latex or polyester latex.

15. The ophthalmic lens of claim 1, wherein the substrate is chosen from:
   (I) the glasses obtained by polymerization of diethylene glycol bis(allyl carbonate);
   (II) the glasses obtained by polymerization of acrylic monomers derived from bisphenol A;
   (III) the glasses obtained by polymerization of allyl monomers derived from bisphenol A.

16. The ophthalmic lens of claim 1, wherein the substrate is chosen from:
   (A) the glasses obtained from poly(methyl methacrylate);
   (B) the glasses obtained from polystyrene resin;
   (C) the glasses made of resin based on diallyl phthalate.

17. The ophthalmic lens of claim 1, wherein the lens further comprises a hard abrasion resistant coating deposited on the optically transparent composite film.

18. The ophthalmic lens of claim 17, wherein the hard abrasion resistant coating is a polysiloxane coating.

19. The ophthalmic lens of claim 18, wherein the polysiloxane coating is obtained by curing a hydrolysate of silanes containing an epoxysilane.

20. The ophthalmic lens of claim 17, wherein the lens further comprises an anti-reflection coating deposited on the hard abrasion-resistant coating.

21. The ophthalmic lens of claim 20, wherein the lens further comprises a hydrophobic top coat deposited on the anti-reflection coating.

22. A process for the manufacture of an ophthalmic lens comprising:
   a) providing a substrate made of organic glass having front and rear and rear main faces,
   b) optionally cleaning and drying the front face of the substrate, which is to receive an optically transparent composite film comprising a latex layer and a polarizing dye material,
   c) applying on the front face of the substrate a latex composition and drying or partially precuring said composition to form a dry latex layer having an outer face,
   d) preparing the face of the latex layer opposite to the substrate by forming parallel microgrooves on the said face of the latex layer,
   e) depositing a polarizing dye material on the front face of the said latex layer having the microgrooves, the said microgrooves being at least partially filled by the polarizing dye material,
   f) treating the resulting polarizing dye material for fixing the polarizing dye material, wherein the latex is not crosslinked and wherein the resulting ophthalmic lens has a mechanical strength resistant to impact energy of not smaller than 2 times the impact energy of the FDA drop ball test.

23. The process of claim 22, wherein, in step f), the treatment of the polarizing dye is made in aqueous solution of inorganic salts in order to reduce the water solubility of said dye material.

24. The process of claim 22, wherein at least 50% of the volume of the microgrooves are filled by the polarizing dye material.

25. The process of claim 22, wherein the parallel microgrooves are totally filled by the polarizing dye material.

26. The process of claim 22, wherein the parallel microgrooves are covered by a continuous layer of the polarizing dye material.

27. The process of claim 22, wherein the parallel microgrooves are formed on the outer face of the transparent composite film with the aid of a slightly abrasive rubbing of the said outer face.

28. The process of claim 27, wherein the outer face of the transparent composite film is rubbed by using a soft cloth and abrasives.

29. The process of claim 23, wherein the process further comprises, prior to applying the polarizing dye material, a cleaning step of the outer face of the transparent composite film provided with the microgrooves.

30. The process of claim 29, wherein the cleaning step comprises:
rinsing with water the outer face of the transparent composite film, and then washing it with a soft cloth,
rinsing again with deionized water the said outer face of the transparent composite film, and then drying it.

31. The process according to of claim 23, wherein the inorganic salts contained in the aqueous treatment solution may be selected in the group essentially consisting of comprise dehydrated barium chloride, aluminium chloride, or barium chloride.

32. The process of claim 22, wherein the process successively includes the steps:
applying a hard abrasion-resistant coating on the transparent composite film, and,
applying an anti-reflection coating on the a hard abrasion-resistant coating, and,
applying an hydrophobic top coat on the anti-reflection coating.

33. The ophthalmic lens of claim 1, wherein the lens has a mechanical strength resistant to impact energy of not smaller than 3 times the impact energy of the FDA drop ball test.

34. The ophthalmic lens of claim 1, wherein the lens has a mechanical strength resistant to impact energy of not smaller than 4 times the impact energy of the FDA drop ball test.

35. The ophthalmic lens of claim 1, wherein the lens has a mechanical strength resistant to impact energy of 2 times the impact energy of the FDA drop ball test.

36. The ophthalmic lens of claim 1, wherein the lens has a mechanical strength resistant to impact energy of 3 times the impact energy of the FDA drop ball test.

37. The ophthalmic lens of claim 1, wherein the lens has a mechanical strength resistant to impact energy of 4 times the impact energy of the FDA drop ball test.

38. The process of claim 22, wherein the lens has a mechanical strength resistant to impact energy of not smaller than 3 times the impact energy of the FDA drop ball test.

39. The process of claim 22, wherein the lens has a mechanical strength resistant to impact energy of not smaller than 4 times the impact energy of the FDA drop ball test.

40. The process of claim 22, wherein the lens has a mechanical strength resistant to impact energy of 2 times the impact energy of the FDA drop ball test.

41. The process of claim 22, wherein the lens has a mechanical strength resistant to impact energy of 3 times the impact energy of the FDA drop ball test.

42. The process of claim 22, wherein the lens has a mechanical strength resistant to impact energy of 4 times the impact energy of the FDA drop ball test.

* * * * *